United States Patent [19]

Peters

[11] Patent Number: 5,735,048
[45] Date of Patent: Apr. 7, 1998

[54] SPHERICAL BEARING HAVING HIGH MECHANICAL STRENGTH, AND METHOD FOR MANUFACTURE

[75] Inventor: Henri Peters, Spycker, France

[73] Assignee: Societe Internationale des Applications et Techniques Mangachoc, Spycker, France

[21] Appl. No.: 839,412

[22] Filed: Apr. 14, 1997

Related U.S. Application Data

[63] Continuation of Ser. No. 374,070, Jan. 19, 1995, abandoned.

[30] Foreign Application Priority Data

Jan. 25, 1994 [FR] France .................. 94 00772

[51] Int. Cl.$^6$ ........................................... B23P 15/00
[52] U.S. Cl. .................. 29/898.045; 29/898.048; 29/432; 29/441.1
[58] Field of Search ............. 29/890.043, 890.045, 29/890.044, 898.048, 432, 464, 441.1; 384/192, 206

[56] References Cited

U.S. PATENT DOCUMENTS

| | | | |
|---|---|---|---|
| 1,638,797 | 8/1927 | Claus | 29/898.048 |
| 2,106,567 | 1/1938 | Hufferd | 29/898.048 |
| 3,116,539 | 1/1964 | Evans et al. | 384/206 |
| 3,179,477 | 4/1965 | Carter . | |
| 3,237,278 | 3/1966 | White | 29/898.048 |
| 3,238,602 | 3/1966 | White | 29/898.048 |
| 3,351,999 | 11/1967 | McCloskey | 29/441.1 |
| 3,526,940 | 9/1970 | Beazley et al. | 29/441.1 |
| 3,626,566 | 12/1971 | Kilgour | 29/441.1 |
| 4,080,015 | 3/1978 | Greby et al. | 384/206 |
| 4,848,934 | 7/1989 | Blakely et al. | 384/206 |
| 5,230,580 | 7/1993 | Henkel | 384/206 |
| 5,265,965 | 11/1993 | Harris et al. | 384/206 |

FOREIGN PATENT DOCUMENTS

| | | |
|---|---|---|
| 2 614 374 | 10/1988 | France . |
| 12 52 043 | 10/1967 | Germany . |
| 27 12 539 | 6/1977 | Germany . |
| 804 392 | 11/1958 | United Kingdom . |

*Primary Examiner*—Larry I. Schwartz
*Assistant Examiner*—Marc W. Butler
*Attorney, Agent, or Firm*—Scully, Scott, Murphy & Presser

[57] ABSTRACT

The invention relates to a spherical bearing having high mechanical strength, and its method of manufacture. This spherical bearing includes a cage (3) containing an internal articulation element (1) and slit along a radius, the edges of the slit (5) of which are connected together, for example by welding, in their final position, at least one of the elements, the cage or the articulation element, being made of an austenitic manganese steel and the other having a treatment to a very high hardness on the articulation surface region.

13 Claims, 1 Drawing Sheet

SPHERICAL BEARING HAVING HIGH MECHANICAL STRENGTH, AND METHOD FOR MANUFACTURE

This application is a continuation of application Ser. No. 08/374,070, filed Jan. 19, 1995, abandoned on Jun. 6, 1997.

The present invention relates to a spherical bearing having high mechanical strength, intended in particular for equipping joints exposed to shock forces and to compressive forces, and its method of manufacture.

Spherical-bearing cages are known which are made of a material treated to the core and having a high hardness (more than 60 HRC), the spherical articulation part of which, of the same material and treatment, is received into the cage by opening the latter along a radius by means of a shock on the side face. However, these spherical bearings are fragile, being subject to fractures of the cage. Moreover, any interruption to the lubrication, especially when exposed to shock and to crushing, renders these spherical bearings very vulnerable.

The invention aims to remedy these drawbacks. There is, in fact, proposed according to the invention a method of manufacturing a spherical bearing having high mechanical strength, especially high abrasion resistance, impact strength and crushing strength, consisting of a spherical articulation element and of a complementary receiving cage, characterized in that it comprises the following steps:

- the machining of the spherical element made of high-hardness steel, pretreated to the core to 882N/mm$^2$–1029N/mm$^2$ (90–105 kg/mm$^2$) and having a surface hardness of 55 HRC, down to 1.5–3 mm;
- the forging and machining of the cage made of austenitic manganese steel of Z 120M 12 grade (12% manganese and 1.2% carbon), having an internal surface diameter slightly greater than that of the spherical element so that its inner circumference is greater than that of this element by a value e of 1–2.5 mm, the internal surface of the cage being furthermore slightly prework-hardened to a hardness of 38 to 40 HRC down to a small depth (a few tenths of 1 mm), whereas the core material preserves its ductility;
- the cutting of the cage, substantially along a radius, using a cutting tool, the blade thickness or cut thickness of which is equal to said value e;
- the extension of the cage in order to permit the insertion of the spherical element (assembly of the spherical bearing), for example by opening the cage on a bottom tool having a conical base, and top insertion of the spherical element by means of a press;
- the clamping of the spherical bearing thus assembled (closing up the edges from cutting the ring) in a jig for shaping the spherical bearing to its final dimensions; and
- the welding of the cut part, controlling the temperature at a low level so as not to impair the treated surfaces of very high-hardness.

Of course, it will be possible to carry out a treatment of finishing the outer surface of the cage, especially in the region of the weld, for example by grinding this region, or else by machining this outer surface to the required external dimension of the cage.

The spherical element is composed of materials which are advantageously grades known by the name Z 30C 13T or 42 CD 4T.

However, for spherical bearings of large diameter (300 mm and more), the materials specified previously for the ring and the spherical element, respectively, may be reversed.

A spherical bearing having high mechanical strength and abrasion resistance is thus obtained, the manganese-based element absorbing the energy of the shock and possible crushing and being automatically work-hardened at the surface against that of the other element in order to permit self-lubrication of the joint. This automatic work hardening increases progressively with the stressing until reaching the hardness of the opposing surface of the spherical element.

The invention also relates to the spherical bearing obtained by the implementation of the aforementioned method.

The invention is illustrated hereinbelow with the aid of an embodiment example and with reference to the appended drawings in which.

Figure 1:
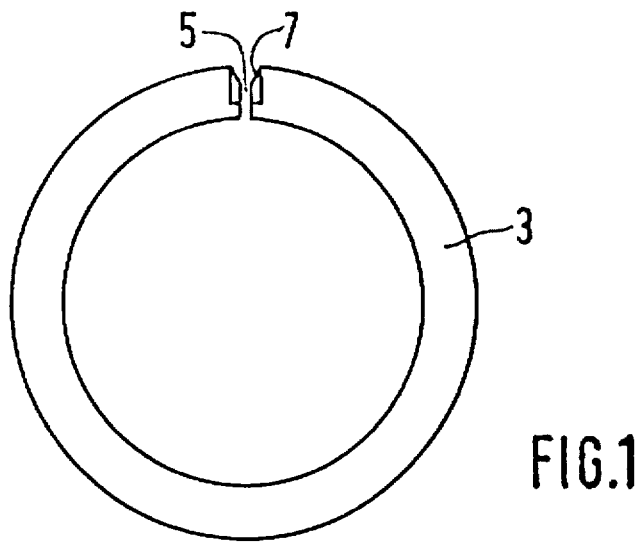
FIG. 1 is a view of a spherical-bearing ring cut and beveled for welding, according to the method of the invention.

With reference to the drawing, the spherical bearing according to the invention, for a joint, is of the type comprising a spherical element 1 or actual spherical bearing element inserted so as to move freely in rotation in a complementary circular ring or cage 3. The spherical bearing is intended to be fitted in a conventional manner onto a shaft via its bore part.

The spherical element 1, typically made by machining, from Z 30C 13T steel pretreated to the core to 882–1029N/mm$^2$ (90–105 kg/mm$^2$) and its surface is heat treated by induction to a very high hardness, approximately 1862N/mm$^2$ (190 kg/mm$^2$) or approximately 55 HRC) down to a depth of 2 to 3 mm. This element undergoes no other treatment.

The ring 3 is made by forging and machining of an austenitic manganese steel of the aforementioned grade Z 120M 12. The inner surface, receiving the spherical element, is slightly prework-hardened to a hardness of 38 to 40 HRC down to a depth of 3–5 tenths of 1 mm. The dimensions of this ring are slightly greater than those of the final ring. In fact, its inner circumference possesses an additional length e, of 1.4 mm, equal to the width of the blade of the tool used for the subsequent cutting operation. This length e may vary up to a maximum of 1 mm, depending on the dimensions of the spherical bearing element, from 100 to 300 mm in diameter, in direct proportion to the diameter. Likewise, its thickness is slightly greater, 1 to 2 mm, in order to permit the subsequent external finishing step (machining) to the final dimension.

The typical first operation of the method of manufacture according to the invention is cutting of the ring along a radius, using a conventional cutting tool, for example a rotating cutting disc of width equal to 1.4 mm. The ring is thus cut at 5 and a bevel 7 is then produced at the top of the slit 5 of the cutting, as depicted in FIG. 1. This bevel is formed over the entire width of the ring, and likewise on its sides to a distance of approximately 1 mm (at the closest) from the treated bottom surface region and down to a depth substantially equal to half the thickness of the latter.

Figure 2:
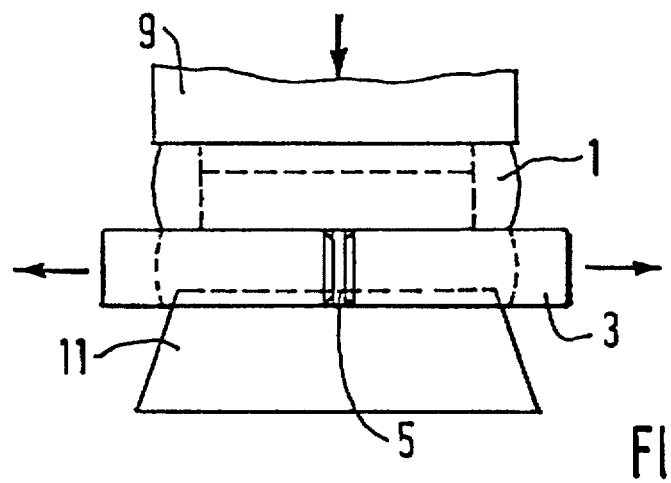
FIG. 2 is a diagrammatic elevation view showing the assembly of the spherical element in the spherical-bearing ring or cage.
Figure 3:
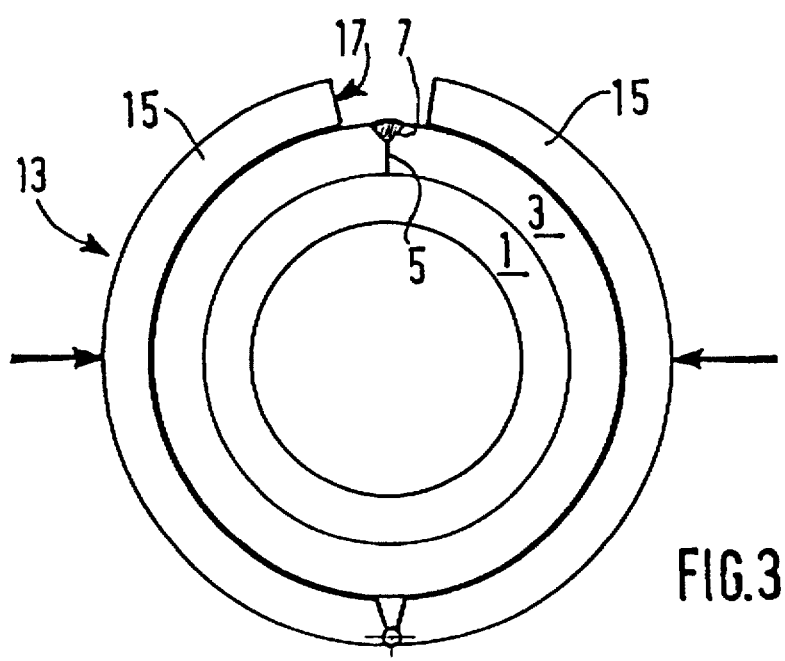
FIG. 3 is a view of the jig for shaping the ring for the welding of its cut ends.

The second operation of the method relates to the assembly, depicted in FIG. 2, of the spherical bearing.

For this operation, a press is used whose applicator ram 9 has a shape which is adapted (complementary) to the side faces of the ring, and an upwardly tapered frustoconical bottom baseplate or die 11, the cross section of which corresponds to the side opening of the ring in order for it to be engaged thereon at the top of it, and having a relatively small cone angle.

The ring is therefore engaged on the die 11 via one of its side openings and the spherical element, placed on the other opening of the ring, receives the applicator ram 9 of the press on its top face. The ram is forcibly applied toward the baseplate, the spherical element remaining in an arrangement parallel to the ring. The latter extends under the action of the cone and as soon as it has been sufficiently separated, the spherical element by itself penetrates into the ring due to the elasticity of the latter.

The spherical bearing is now assembled and can undergo the third operation, that of joining up the cut edges of the ring. This operation consists in welding the region of the bevel 7 of the slit in the ring.

The spherical bearing is inserted into a jig 13 for shaping the ring to its final service dimension. This jig includes two substantially semicircular jaws 15 which are complementary to the ring in its closed-up shape and are pivoted at the bottom part. These jaws, forcibly applied against each other until the ring is completely closed up with the cutting edges applied against each other, provide a top opening 17 enabling said welding operation to be performed. The latter is performed conventionally with an electric arc (under neutral gas between electrodes) with addition of material via an appropriate wire of welding material, for example one based on nickel-chrome, at a temperature below 250° C. in order not to affect the treated surface regions. For the same reason, these treated regions are not approached closer than 1 mm (on the side bevels) and the spherical element is oriented at 90° from the ring and some distance from the weld. When the ring is made of austenitic manganese steel, the weld cover layer is made from the same material as the ring.

When the welding operation has been completed, an operation to machine the ring to its final external dimension is performed. This finishing operation makes it possible to conceal the weld produced.

The spherical bearing is then complete.

It will be noted that the invention is not limited to the example described and that many embodiment variants may be included in it. Thus the assembly, instead of being carried out flat, as described hereinabove, may be carried out with the spherical element applied perpendicular to the ring, held by part of its circumference on an applicator ram of suitable shape, whereas the ring is opened on a bottom baseplate which is wide open in its internal part (of sleeve type [sic] receiving the side faces of the ring.

Likewise, the shaping jig may have a shape with a conical internal bore forcibly receiving the spherical bearing element in abutment at its final closed-up position.

I claim:

1. A method of manufacturing an assembled spherical bearing possessing a high mechanical strength, abrasion resistance, impact strength and crushing strength, said bearing consisting of a spherical articulation element and an annular cage having said spherical articulation element assembled therein; said method comprising the steps of:

(a) machining the spherical articulation element which is constituted of a pretreated high-hardness steel to form a core of a hardness of within about 882 to 1029N/mm$^2$ and having a surface hardness of at least 55 HRC to a depth of about 1.5 to 3 mm;

(b) forging and machining the cage which is constituted of austenitic manganese steel of Z 120M 12 grade including 12% manganese and 1.2% carbon, said cage having an outer surface and an internal annular surface dimensioned to possess a diameter larger than an external diameter of the spherical articulation element so that the cage has an inner circumference which is greater than outer circumference of said spherical articulation element by a value e of about 1 to 2.5 mm, the internal annular surface of the cage being treated by preworking to a hardness of 38 to 40 HRC to a depth of a few tenths of a millimeter while the material of the remaining thickness of the annular cage remains ductile;

(c) cutting through the annular cage substantially along a radius with a cutting tool having a blade thickness to form a cut thickness which is equal to said value e of 1 to 2.5 mm;

(d) radially expanding the annular cage to facilitate insertion therein of the spherical articulation element to form the assembled spherical bearing;

(e) clamping the assembled spherical bearing in a jig for shaping the spherical bearing to predetermined final and external dimensions thereof; and (f) welding the radial cut in said cage of said clamped assembled bearing while controlling the temperature of said welding to a level so as not to impair the treated surfaces of said bearing.

2. A method of manufacture according to claim 1, comprising finishing said outer surface of the cage at least in a weldment area of the radial cut.

3. A method of manufacture according to claim 2, wherein said weldment area of the radia cut is finished by grinding.

4. A method of manufacture according to claim 2, wherein said outer surface of said annular cage is machined to final and external dimensions of the cage.

5. A method of manufacture according to claim 1, wherein said cage is expanded by opening thereof on a bottom tool having a conical base and inserting the spherical articulation element from the top through the application of a press.

6. A method of manufacture according to claim 1, wherein the spherical articulation element comprises a material which is selected from the group of materials consisting of grades Z 30C 13T and 42 CD 4T, an inner articulation surface of said element being treated to a hardness of 1862N/mm$^2$ to a depth of 2 to 3 mm.

7. A method of manufacture according to claim 6, wherein, for spherical bearings possessing large diameters of at least 300 mm, the selection of materials of the spherical articulation element and of the cage is interchangeable.

8. A method of manufacture according to claim 1, wherein a bevel is formed on the radial cut of the cage to facilitate said welding, said bevel being formed along an entire width of the cage and along opposite side surfaces of the cut to a distance of approximately 1 mm from a treated bottom surface region of a predetermined thickness, and to a depth which is substantially one-half the thickness of the treated bottom surface region.

9. A method of manufacture according to claim 1, wherein a press effects said assembling, said press having an applicator arm having a shape which is complementary to the side faces of the cage, and an upwardly tapered frusto-conical bottom baseplate with a narrow cone angle, having a cross-section which conforms with the side opening of the cage to facilitate engagement thereon at a top thereof.

10. A method of manufacture according to claim 1, wherein for clamping of the assembled spherical bearing for effecting the welding of the cut, said jigj includes two substantially semicircular jaws which are complementary to the cage closed condition and are pivoted at a bottom juncture, said jaws being forcibly applied against each other until the cage is completely closed with the edges of the cut abutting each other, and said jig providing a top opening enabling effectuation of said welding operation.

11. A method of manufacture according to claim 10, wherein the jig has a shape with a conical internal bore forcibly receiving the spherical bearing in abutment in the completely closed position of said cage.

12. A method of manufacture according to claim 1, wherein said welding operation is performed by electric arc welding with an addition of welding material wire based on nickel-chrome, at a welding temperature below 250° C. so as to inhibit affecting the treated surface regions.

13. A method of manufacture according to claim 1, wherein the assembling of the spherical bearing is carried out with the spherical element applied perpendicular to the cage and retained along a portion of the circumference thereof on an applicator ram, the cage being opened on a bottom baseplate which is extensively opened in an internal part having a sleeve receiving the side faces of the cage.

\* \* \* \* \*